US011767095B2

(12) United States Patent
Christensen

(10) Patent No.: US 11,767,095 B2
(45) Date of Patent: Sep. 26, 2023

(54) SYSTEM AND A METHOD FOR HEAT TREATMENT OF WATER OF A VESSEL

(71) Applicant: Bawat A/S, Hørsholm (DK)

(72) Inventor: Ole Luthcke Christensen, Kgs. Lyngby (DK)

(73) Assignee: Bawat A/S, Hørsholm (DK)

( * ) Notice: Subject to any disclaimer, the term of this patent is extended or adjusted under 35 U.S.C. 154(b) by 740 days.

(21) Appl. No.: 16/618,098

(22) PCT Filed: May 29, 2017

(86) PCT No.: PCT/EP2017/062940
§ 371 (c)(1),
(2) Date: Nov. 27, 2019

(87) PCT Pub. No.: WO2018/219429
PCT Pub. Date: Dec. 6, 2018

(65) Prior Publication Data
US 2020/0198752 A1      Jun. 25, 2020

(51) Int. Cl.
*B63J 4/00* (2006.01)
*C02F 1/02* (2023.01)
*C02F 103/00* (2006.01)

(52) U.S. Cl.
CPC ............... *B63J 4/002* (2013.01); *C02F 1/02* (2013.01); *C02F 2103/008* (2013.01)

(58) Field of Classification Search
CPC .... C02F 1/02; C02F 1/008; C02F 1/00; C02F 2103/008; C02F 2103/00; B01D 35/02; B63J 2/12; B63J 4/002; B63J 4/006; B63J 4/00; B63B 13/00; B63B 35/44; F28D 2021/0042; F28D 7/10; F28F 9/02; Y02T 70/00; Y02T 70/36

USPC .......................................................... 237/59
See application file for complete search history.

(56) References Cited

U.S. PATENT DOCUMENTS

| 2004/0055966 A1* | 3/2004 | Nguyen | .................. C02F 1/325 |
| | | | 210/748.11 |
| 2009/0078654 A1* | 3/2009 | Nishizawa | ................ C02F 1/34 |
| | | | 210/150 |

FOREIGN PATENT DOCUMENTS

| AU | 710808 B3 * | 9/1999 | ............... F28F 9/02 |
| EP | 1717205 A1 | 11/2006 | |
| WO | 2004002895 A2 | 1/2004 | |
| WO | 2009146504 A1 | 12/2009 | |

(Continued)

OTHER PUBLICATIONS

Damen Green Solutions, "Something about the costs; Ballast Water Compliance".

(Continued)

*Primary Examiner* — Akash K Varma
(74) *Attorney, Agent, or Firm* — NIXON PEABODY LLP

(57) ABSTRACT

A system and a method are for heat treatment of water of a vessel outside a fixed installation of the vessel. The water includes ballast water of the vessel and/or waste water from hull cleaning of the vessel. The system includes a system inlet; a system outlet; a heat application section; and a heat treatment piping system. A heat recovering section includes two parts for exchanging heat. The heat treatment piping system couples the system inlet to the system outlet via: one of the parts of the heat recovering section, the heat application section and the other part of the heat recovering section. The system does not form part of a fixed installation of the vessel.

27 Claims, 6 Drawing Sheets

(56) References Cited

FOREIGN PATENT DOCUMENTS

| WO | WO 2009/146504 A1 * | 12/2009 | ................ C02F 1/02 |
|----|---------------------|---------|---------------------------|
| WO | 2012116698          | 9/2012  |                           |
| WO | 2012116704          | 9/2012  |                           |
| WO | 2015104341          | 7/2015  |                           |
| WO | 2015177280          | 11/2015 |                           |
| WO | 2016083470          | 6/2016  |                           |
| WO | 2016113156          | 7/2016  |                           |

OTHER PUBLICATIONS

Korean Office Action issued for Korean Patent Application No. 10-2019-7038533, dated Mar. 30, 2021 in 25 pages including English translation.
International Search Report for PCT Application No. PCT/EP2017/062940, dated Feb. 7, 2018 in 2 pages.

* cited by examiner

SYSTEM AND A METHOD FOR HEAT TREATMENT OF WATER OF A VESSEL

CROSS-REFERENCE TO RELATED APPLICATIONS

This application is the U.S. National Phase under 35. U.S.C. § 371 of International Application PCT/EP2017/062940, filed May 29, 2017, the disclosure of which including the specification, the drawings, and the claims is hereby incorporated by reference in its entirety.

NOTICE OF SOURCE OF FUNDING the project leading to this application has received funding from the European Union's horizon 2020 research and innovation programme under grant agreement no 756288.

FIELD OF THE INVENTION

The present invention relates to a system and a method for heat treatment of water of a first vessel, wherein the water comprises ballast water of the first vessel and/or waste water from hull cleaning of the first vessel.

BACKGROUND OF THE INVENTION

Vessels, such as ships or any other naval constructions, are usually provided with one or more ballast tanks that are configured to hold water. Water which is held by a ballast tank is usually denoted ballast water. Usually, the amount of water in a ballast tank may be adjusted in order to obtain a desired amount by loading a desired amount of water into the tank from the sea surrounding the vessel or by discharging a desired amount of water from the ballast tank to the sea. Such loading and discharge is usually carried out by means of a ballast pump and pipes providing fluid connection between the ballast tank and the sea surrounding the vessel. Water, which is about to be loaded into a ballast tank, as well as water, which has been discharged from a ballast tank, may as well be denoted ballast water. Accordingly, the term "ballast water of a first vessel" may be understood as water that has been used for ballasting the first vessel and/or water that is intended to and/or about to be used for ballasting the first vessel. The term "ballast water of a first vessel" may be understood as water that has been within one or more ballast tanks of the first vessel and/or water that is intended to and/or about to enter one or more ballast tanks of the first vessel.

The purpose of such ballast tanks is to enable the vessel to maintain and/or achieve stability and/or to obtain a desired level of buoyancy as well as a desired center of gravity. The desired amount of ballast water within the ballast tanks of a vessel may for instance depend on whether the vessel is carrying cargo or not, as well as the nature of such cargo. The process of loading ballast water into a vessel may be denoted ballasting. The term ballasting may be used irrespectively of whether there is a net intake of ballast water into the respective vessel or not. For instance, one ballast tank may be loaded with ballast water while ballast water is being discharged from another ballast tank. The process of discharging ballast water from a vessel may be denoted de-ballasting. The term de-ballasting may be used, irrespectively of whether there is a net discharge of ballast water from the respective vessel or not.

The water that is being used for ballasting a vessel is usually taken from the sea surrounding the respective vessel, which sea usually contains live microorganisms, such as plankton, algae, etc.

Vessels, such as cargo vessels, may travel vast distances over the ocean, e.g. from one cargo port to another. Accordingly, when a vessel is de-ballasting, water containing live microorganisms that may originate from the sea of a distant part of the world may be discharged into the local part of the sea surrounding the vessel. Accordingly, such discharge of ballast water into the sea may potentially introduce undesired microorganisms, or an undesired amount hereof, into the marine environment of the location of the discharge. For instance, live microorganisms from another part of the world may be a threat to the local marine life of the location of discharge.

Every year, ocean going vessels move billions of cubic meters of water containing live microorganisms from one part of the world to another. Accordingly, such vessels constitute a contributing factor in the introduction of hundreds of invasive marine species to new environments which is considered to be an environmental issue.

According to certain national and/or international agreements, conventions, and laws, such as drawn up by the International Maritime Organization (IMO), it is required, or it may be required, that ballast water, which is being discharged from a vessel, complies with certain standards, such as defining an upper threshold for the concentration of living microorganisms allowed in the discharged ballast water. Furthermore, this threshold may vary between different countries/regions and/or may change with time.

A required maximum concentration threshold level of microorganisms in the discharged ballast water may be complied with by treating the ballast water at some point prior to de-ballasting. Different systems and methods for treatment of ballast water exist, e.g. utilizing heat treatment—also known as pasteurization. Other examples comprise use of UV-light irradiation or treatment by chlorine, both of which may require a filter, such as a 50 μm filter, i.e. a filter configured to filter particles of 50 μm and larger, for filtering some of the larger particles containing living organisms that otherwise may survive such treatment. Treatment by pasteurization has the advantage of usually not requiring such filter.

WO2016083470, WO2016113156, WO2015104341, WO2012116698, and WO2012116704 describe various systems and methods for treatment of ballast water.

Furthermore, it is known that a ballast water treatment system installed, i.e. fixed, on a vessel may malfunction.

Furthermore, it is known that buildup of marine fouling on the hull of a vessel may lead to increased drag, resulting in a detrimental impact on the vessel's hydrodynamic performance and hence the relationship between speed, power performance and fuel consumption. Fouling, particularly in the case of a prolific buildup of 'hard or shell fouling' like barnacles or tubeworm, can cause turbulence, cavitation and noise, frequently affecting the performance of sonars, speed logs and other hull mounted sensors.

Accordingly, fuel saving of a vessel is often the major reason for making underwater hull cleaning an integral part of planned maintenance of a vessel. However, in a similar manner as explained above for ballast water, discharge of marine fouling from the hull of a vessel may release an undesired amount of live microorganisms at the location of the hull cleaning of a vessel.

SUMMARY OF THE INVENTION

The inventors of the present invention have realized a need for an improved handling of ballast water of vessels and/or waste water from hull cleaning of vessels.

According to a first aspect of the present invention there is provided a method for heat treatment of water of a first vessel, wherein the water comprises ballast water of the first vessel and/or waste water from hull cleaning of the first vessel. The method comprises providing a flow of the water from a system inlet towards a system outlet. The flow is provided via the following: a first part of a heat recovering section; a heat application section; and a second part of the heat recovering section. Accordingly, the method provides that the water is flowing from the system inlet to the first part of the heat recovering section. Furthermore, the method provides that the water is flowing from the first part of the heat recovering section to the heat application section. Furthermore, the method provides that the water is flowing from the heat application section to the second part of the heat recovering section. Furthermore, the method provides that the water is flowing from the second part of the heat recovering section to the system outlet. Accordingly, the method provides that the water flows through the following: the first part of a heat recovering section; the heat application section; and the second part of the heat recovering section. Furthermore, the method provides that the flow of the water is provided by means of a heat treatment piping system and possibly by means of other features, such as a pump, as explained within the present disclosure. The method comprises applying heat to the water at the heat application section. Accordingly, the water is heated while flowing through the heat application section. The method comprises recovering heat from the heated water at the heat recovering section by having the water, which is flowing through the second part of the heat recovering section, pre-heating the water, which is flowing through the first part of the heat recovering section. Accordingly, heat is exchanged, i.e. transferred, from the second part of the heat recovering section, which is heated by the water flowing through this part, to the first part of the heat recovering section, which disposes heat to the water flowing through this part. According to the method of the present invention both the step of applying heat and the step of recovering heat occurs outside a fixed installation of the first vessel.

According to a further aspect of the present invention there is provided a system for heat treatment of water of a first vessel outside a fixed installation of the first vessel. The water comprises ballast water of the first vessel and/or waste water from hull cleaning of the first vessel. The system comprises a system inlet and a system outlet. The system comprises a heat application section configured for applying heat to the water, such that the water that is flowing through the heat application section is heated. The system comprises a heat recovering section configured for recovering heat from the heated water, the heat recovering section comprising a first part and a second part configured for exchanging heat from one part to the other. The system comprises a heat treatment piping system coupling the system inlet to the system outlet via: the first part of the heat recovering section; the heat application section; and the second part of the heat recovering section. The system provides that the water may flow from the system inlet to the first part of the heat recovering section. The system provides that the water may flow from the first part of the heat recovering section to the heat application section. The system provides that the water may flow from the heat application section to the second part of the heat recovering section. The system provides that the water may flow from the second part of the heat recovering section to the system outlet. Accordingly, the system provides that the water may flow through the following: the first part of the heat recovering section; the heat application section; and the second part of the heat recovering section. The heat recovering section is configured for exchanging, i.e. transferring, heat such that the water, which is flowing through the second part of the heat recovering section, is pre-heating the water, which is flowing through the first part of the heat recovering section. Accordingly, heat may be recovered. Preferably, the system does not form part of a fixed installation of the first vessel.

Heat treatment of ballast water, according to the present invention, may for instance be carried out during ballasting or during de-ballasting. As an alternative to treatment during ballasting or treatment during de-ballasting, treatment may be carried out in-between ballasting and de-ballasting, e.g. by circulating ballast water of a ballast tank while treating the ballast water, such as disclosed by WO2012116704 and WO2012116698, or by moving ballast water from one ballast tank to another ballast tank while treating the ballast water, such as disclosed by WO2015104341. These two modes of treatment may be denoted "circulation treatment" and "tank-to-tank-treatment", respectively.

Heat treatment of ballast water during ballasting/de-ballasting may limit the throughput of ballast water to from a vessel compared to ballasting/de-ballasting without such ballast water heat treatment. Furthermore, a malfunction of the utilized treatment system may be time-critical if treating during ballasting/de-ballasting. Treatment during ballasting may have the advantage that the ballast water then can be discharged anywhere immediately if needed. Treatment during de-ballasting may have the advantage that the ballasting process is not potentially being delayed by a treatment process. Treatment during de-ballasting may have the advantage that no planning and/or time is required for treatment in between ballasting and de-ballasting.

Heat treatment during ballasting or heat treatment during de-ballasting may, in particular if utilizing a heat treatment system of a fixed installation of the vessel in question, be less energy efficient, e.g. compared to heat treatment in-between ballasting and de-ballasting, since the generation of surplus heat of the vessel, which may be utilized for such pasteurizing methods, may be lower while ballasting/de-ballasting, which often may take place while a vessel is at port. However, since the present invention utilizes application of heat and recovery of heat outside a fixed installation of the first vessel, it is facilitated that desired options for applying heat are better available than for a fixed installation of a vessel. For instance, utilization of connections to district heating and or electric heating may be easier available for a system/method according to the present invention than for a treatment system installed on a vessel, which may enter various different ports.

A disadvantage with treatment in-between ballasting and de-ballasting may be that such methods may require adequate time in between the ballasting and de-ballasting process. A disadvantage with the circulation treatment may be that it may require an increased amount of time, e.g. compared to the tank-to-tank-treatment, since the amount of ballast water being circulated for the circulation treatment of a ballast tank may be higher than the amount of ballast water being held by the respective tank, which is due to that the ballast water of a ballast tank may averagely be circulated more than once. A disadvantage with the tank-to-tank-treatment may be that it requires available ballast tank capacity. Furthermore, the tank-to-tank-treatment may cause a shift in ballast properties of the vessel. An advantage for treating in-between ballasting and de-ballasting may be that both the ballasting and the de-ballasting may be carried out without taking any such treatment process into account, which otherwise may pose an issue while at port, e.g. in case of a malfunction of the respective ballast water treatment system or in case the ballast water treatment system cannot provide a desired throughput of ballast water.

Accordingly, it is clear that there may be both advantages and disadvantages with any treatment mode depending on the situation.

Accordingly, it is an advantage for the present invention that there are provided systems and methods wherein the same system for heat treatment may be utilized for a plurality of treatment modes. This enables the option to select to have ballast water being treated for any one or more of the following situations: while loading a ballast tank; while discharging a ballast tank; and in between loading and discharging a ballast tank. Furthermore, the present invention enables to select to treat the ballast water of the vessel for any one or more of the following situations: while ballasting a vessel; while de-ballasting a vessel; and in between ballasting and de-ballasting a vessel.

Furthermore, the systems and the methods according to the present invention may be utilized for treatment of ballast water of any vessel irrespectively of whether or not the vessel in question is equipped with a ballast water treatment system of its own or not. For instance, in case a ballast tank of the first vessel contains ballast water, which has been treated, e.g. with a ballast water treatment system installed, i.e. fixed, on the first vessel, but where the treatment somehow has not lead to a desired and/or required reduction in living microorganisms in the ballast water, then the ballast water of that ballast tank in question, and possibly other ballast tanks of the first vessel, may be subject to heat treatment according to the present invention.

Furthermore, the systems and methods according to the present invention may be utilized for treatment of waste water from hull cleaning of the first vessel and/or any other vessel.

According to a further aspect of the present invention there is provided a heat treatment and water storage system comprising the system according to the present invention for heat treatment of water of a first vessel outside a fixed installation of the first vessel. The heat treatment and water storage system comprises an outlet storage tank coupled to the system outlet of the system for heat treatment. Alternatively, or additionally, heat treatment and water storage system comprises an inlet storage tank coupled to the system inlet of the system for heat treatment.

The present invention relates to different aspects including the apparatus/device/system described above and in the following and to corresponding methods, such as described above and in the following. Each aspect may yield one or more of the benefits and advantages described in connection with one or more of the other aspects, and each aspect may have one or more embodiments with all or just some of the features corresponding to the embodiments described in connection with one or more of the other aspects and/or disclosed in the appended claims.

Other systems, methods and features of the present invention will be or will become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The above, as well as additional objects, features and advantages of the present inventive concept, will be better understood through the following illustrative and non-limiting detailed description of preferred embodiments and/or features of the present inventive concept, with reference to the appended drawings, where like reference numerals may be used for like elements.

The accompanying drawings are included to provide a further understanding of the invention, and are incorporated in and constitute a part of this specification. The drawings illustrate embodiments of the invention and, together with the description, serve to explain the principles of the invention.

Figure 1:
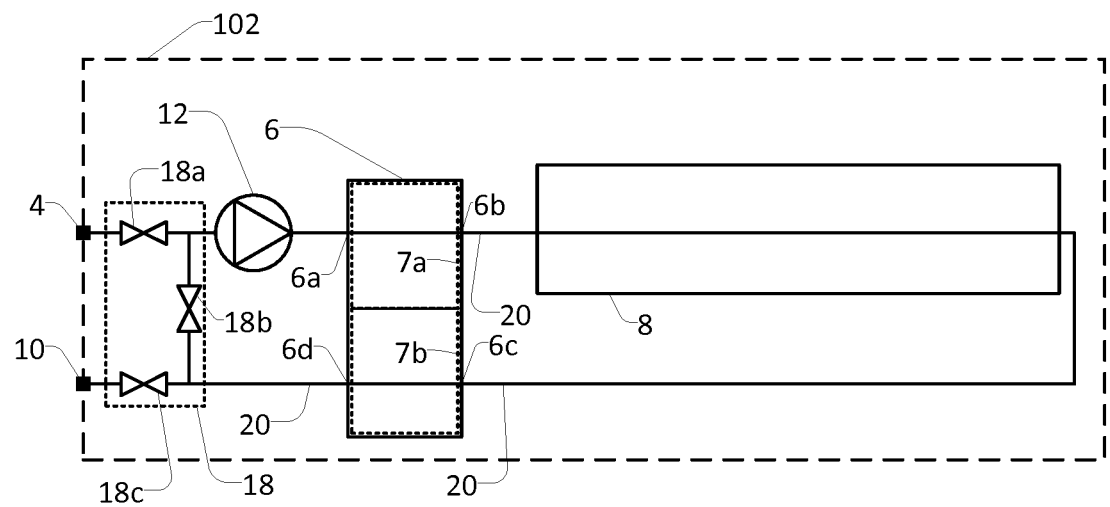

Other and further aspects and features may be evident from reading the following detailed description of the embodiments.

The drawings illustrate the design and utility of embodiments, in which similar elements may be referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings may only depict typical embodiments and may therefore not be considered limiting of its scope.

FIG. 1 schematically illustrates a first embodiment of a system according to the present invention for heat treatment of water.

Figure 2:
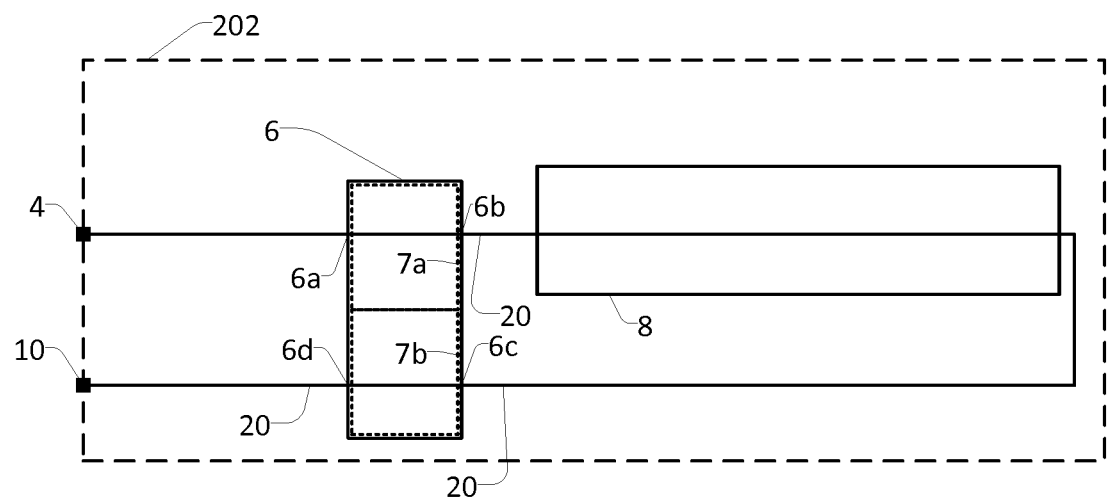

FIG. 2 schematically illustrates a second embodiment of a system according to the present invention for heat treatment of water.

Figure 3:
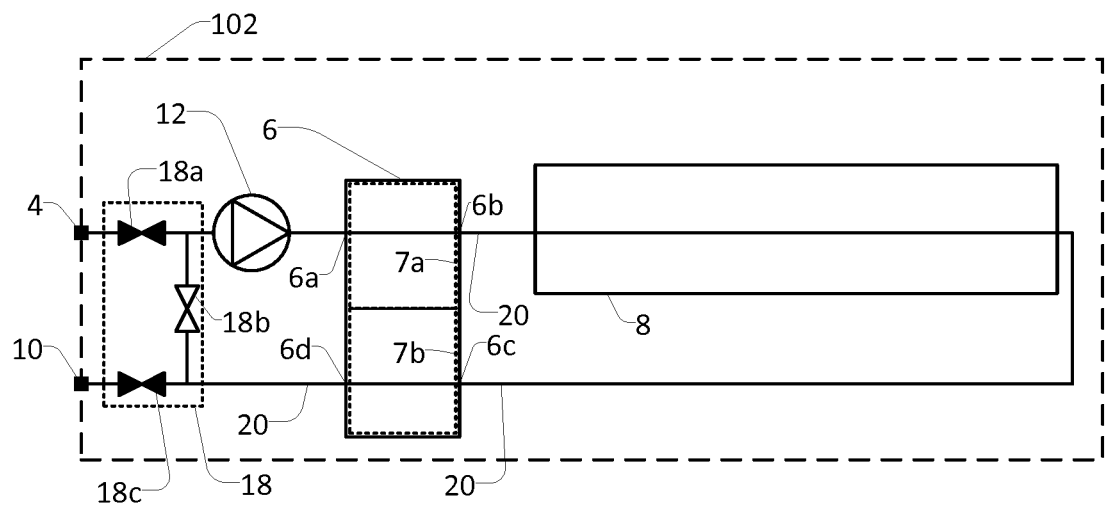
Figure 4:
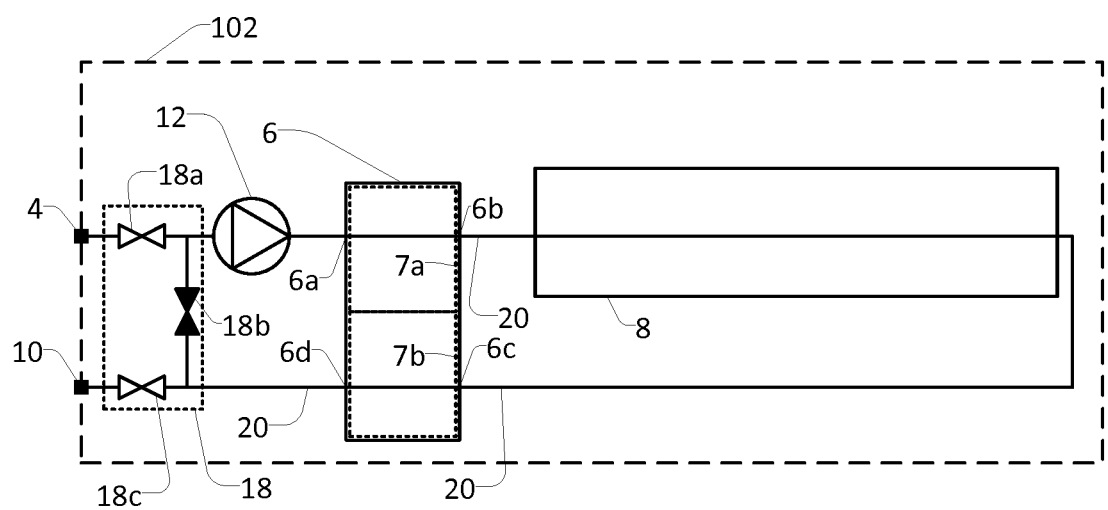

FIGS. 3-4 schematically illustrate two different modes of operation of the first embodiment of FIG. 1.

Figure 5:
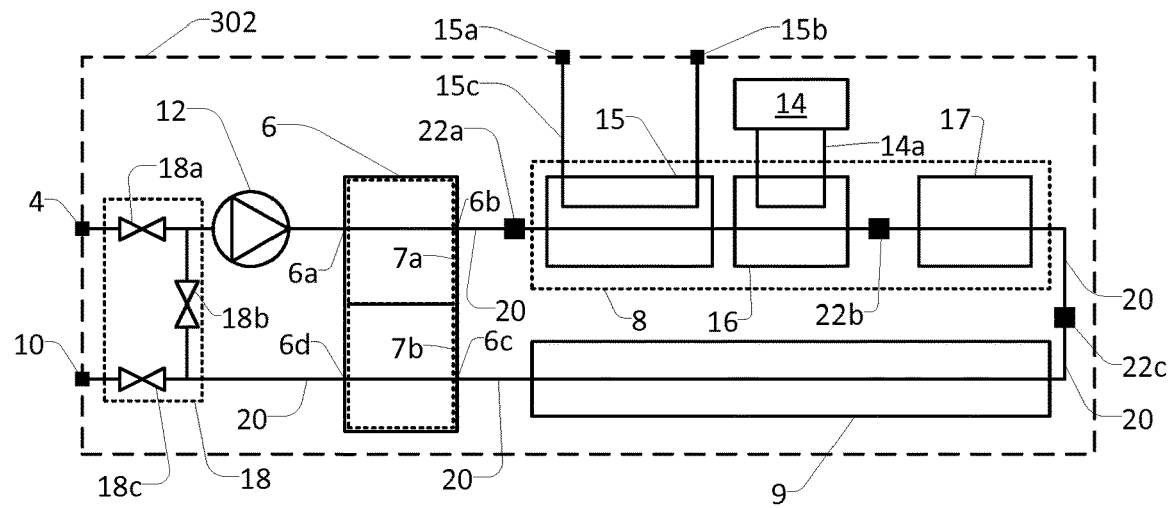

FIG. 5 schematically illustrates a third embodiment of a system according to the present invention for heat treatment of water.

Figure 6:
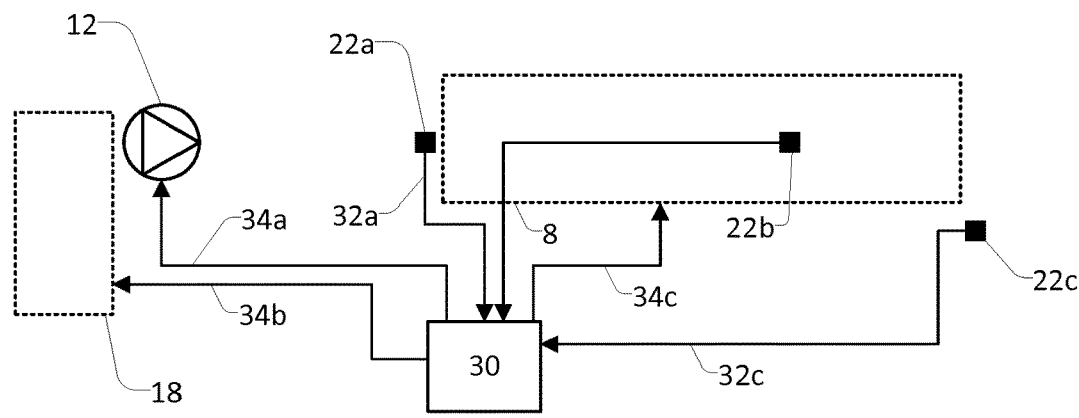

FIG. 6 schematically illustrates an embodiment of a controller configured to control a system according to the present invention.

Figure 7:
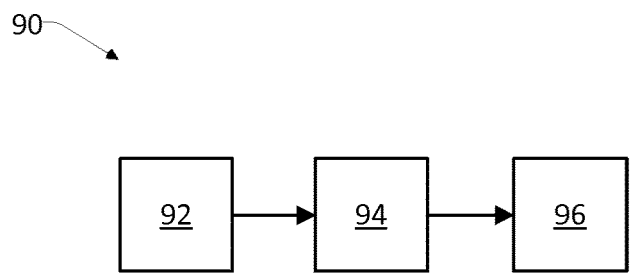
Figure 8:
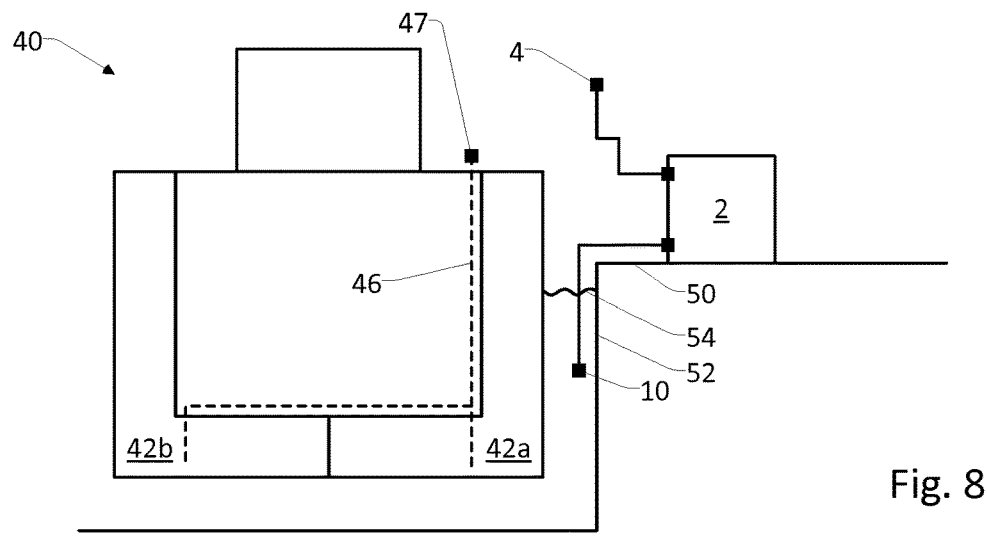

FIG. 7 schematically illustrates an embodiment of a method according to the present invention for heat treatment of water.

FIGS. 8-13 schematically illustrate various setups and modes of utilization of a system according to the present invention for heat treatment of ballast water as well as a method according to the present invention for heat treatment of ballast water.

Figure 14:
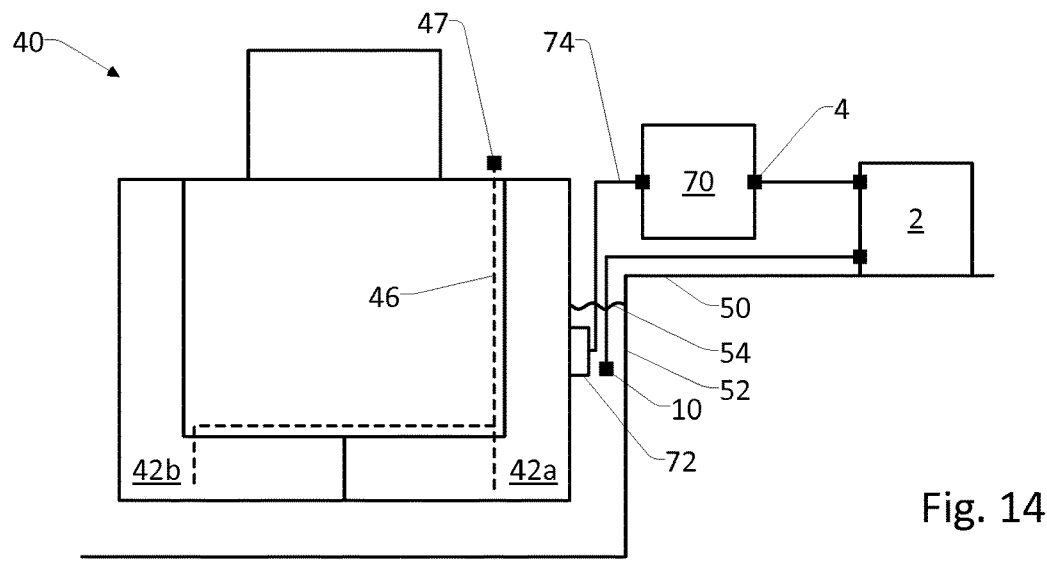

FIG. 14 schematically illustrates a setup and a mode of utilization of a system according to the present invention for heat treatment of waste water from hull cleaning of a vessel as a method according to the present invention for heat treatment of waste water from hull cleaning of a vessel.

Figure 15:
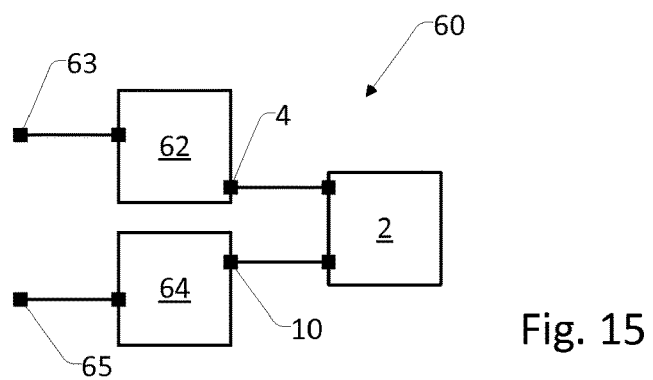

FIG. 15 schematically illustrates a first embodiment of a heat treatment and water storage system.

DETAILED DESCRIPTION

The system and/or method according to the present invention may be configured for heating the water to an appropriate temperature and keeping the water at the appropriate temperature, or close thereto, for an appropriate amount of time. This may be understood as heat treatment. Heat treatment is also known as pasteurization. The heat treatment of the water is intended to reduce the amount of living microorganisms to a level being below a required threshold. Living microorganisms may for instance comprise zooplankton, phytoplankton, and bacteria.

The heat recovering section may comprise: a primary inlet; a primary outlet; a secondary inlet; and a secondary outlet. The primary outlet may be coupled to the secondary inlet via the heat application section. The primary inlet may be coupled to the system inlet. The secondary outlet may be coupled to the system outlet.

According to the present invention the water, which is flowing from the system inlet towards the heat application section, may be pre-heated prior to entering the heat application section by means of the heat recovering section.

Accordingly less heat needs to be applied to the water within the heat application section for heating the water to a desired temperature than if the water is not pre-heated by such heat recovering section prior to entering the heat application section.

It may be an advantage that by using the heat treatment according to the present invention there may be no need for pre-treatment filtration. Furthermore, there may be no need for a sludge tank and/or a waste tank.

It may be an advantage according to the present invention that since one single system may be utilized for several vessels, e.g. one after the other, the system may be less prone to cost related issues compared to other treatment systems that are installed on a vessel and intended only for treatment of ballast water of that particular vessel.

The system according to the present invention may be configured for carrying out the method according to the present invention.

Throughout the present disclosure, the term "the water" usually refers to "the water of the first vessel" unless explained otherwise.

Throughout the present disclosure, the term "the system" usually refers to "the system according to the present invention for heat treatment of water of a first vessel" unless explained otherwise.

The system may be provided as a system for heat treatment of water of a first vessel situated on the first vessel, where the system remains a non-fixed installation of the first vessel. Non-fixed may imply that the system or any part thereof is not welded to the first vessel. Non-fixed may imply that the system may be only temporarily situated on the first vessel, e.g. while treating water of the first vessel. The term temporarily may be understood as less than a pre-determined time and/or with the intention of less than a pre-determined time. Such pre-determined time may be a week, two weeks, a months, or two months. Non-fixed may imply that the system or any part thereof is not situated on the first vessel when the first vessel is at sea, i.e. sailing.

The heat recovering section may comprise a heat exchanger. Any heat exchanger being provided and/or utilized according to the present invention may comprise a plate heat exchanger.

The method may comprise temporarily coupling at least one of the system inlet and the system outlet to a ballast water piping system of the first vessel, wherein the water of the first vessel comprises ballast water of the first vessel. The system may be configured for temporarily coupling at least one of the system inlet and the system outlet to a ballast water piping system of the first vessel, e.g. using vessel piping connector, wherein the water of the first vessel comprises ballast water of the first vessel. Accordingly, a system and a method for external heat treatment of ballast water may be provided. The vessel piping connector may comprise a flange configured for temporarily coupling the at least one of the system inlet and the system outlet to the ballast water piping system of the first vessel. Utilization of a flange may facilitate connection with a vessel. This may in particular be an advantage, since the system may be intended for being coupled to a variety of different vessels.

The method may comprise utilizing one or more ballast pumps of the first vessel for providing a flow of the ballast water from at least one ballast tank of the first vessel towards the system inlet and/or from the system outlet towards at least one ballast tank of the first vessel. The system may be configured for having at least one ballast pump of the first vessel being utilized for providing a flow of the ballast water from at least one ballast tank of the first vessel towards the system inlet and/or from the system outlet towards at least one ballast tank of the first vessel. Accordingly, a treatment pump configured for providing the flow of the water through the system may not be needed, or the requirements for such pump may by lower than if no ballast pump is utilized. The one or more ballast pumps of the first vessel may for instance be configured to provide ballast water from a ballast tank of the first vessel at a pressure of 2 bar or more at the system inlet.

The method may comprise temporarily coupling the system inlet to the ballast water piping system of the first vessel. Furthermore, the method may comprise providing ballast water from the first vessel back to the first vessel via the system outlet. The system may be configured for temporarily coupling the system inlet to the ballast water piping system of the first vessel, and configured for providing the water from the first vessel back to the first vessel via the system outlet. Accordingly, heat treatment may be provided to a vessel in between ballasting and de-ballasting. In this connection, it is clear that the net amount of ballast water effectuating the first vessel will temporarily be reduced while being treated by the system according to the present invention, unless the system is being temporarily situated on the first vessel. For instance, ballast water from a first ballast tank of the first vessel may be provided to a second ballast tank of the first vessel after being treated by the system according to the present invention.

The system may be configured for temporarily coupling a second of the system inlet and the system outlet to a ballast water piping system of a second vessel, i.e. in combination with a first of the system inlet and the system outlet being temporarily coupled to a ballast water piping system of the first vessel, such that the water may be provided between the first vessel and the second vessel via the system for heat treatment. The method may comprise temporarily coupling a second of the system inlet and the system outlet to a ballast water piping system of a second vessel and the method may comprise providing the water between the first vessel and the second vessel via: the system inlet; the heat application section; the heat recovering section; and the system outlet. Accordingly, for a situation where one vessel needs to de-ballast water, that needs treatment, and where another vessel needs ballast water, both needs can at least in part be accommodated by using the water that has been treated for ballasting. This may save energy and capacity of heat treatment of water.

The system may comprise a treatment pump configured for providing the flow of the water between the system inlet and the system outlet. The method may comprise providing the flow of the water between the system inlet and the system outlet using a treatment pump. Usage of such treatment pump may be in combination with usage of any other pump, such as usage of a ballast pump of the first vessel. Usage of a treatment pump enables the system to operate independently of other pumps or at least less dependent of such than if no treatment pump is provided. The treatment pump may be provided between the system inlet and the heat recovering section. Accordingly, provision or a required and/or desired pressure at a location where it is needed may be facilitated. For instance, the flow of water through the heat recovering section may induce a fall in pressure. The flow of the water between the system inlet and the system outlet may, additionally or alternatively, be provided using a third pump being different from the aforementioned treatment pump and ballast pump. Such third pump may for instance form part of a system for hull cleaning of a vessel.

The system for heat treatment may comprise a mode valve system. The mode valve system may comprise: an inlet valve, an outlet valve, and an internal valve. The inlet valve may be provided between the system inlet and the primary inlet of the heat recovering section. Accordingly, the primary inlet of the heat recovering section may be coupled to the system inlet via the mode valve system. The outlet valve may be provided between the system outlet and the secondary outlet of the heat recovering section. Accordingly, the secondary outlet may be coupled to the system outlet via the mode valve system. The internal valve may be provided between the primary inlet of the heat recovering section and the secondary outlet of the heat recovering section. Accordingly, the secondary outlet may be coupled to the primary inlet via the mode valve system. Another suitable mode valve system may be provided instead of or in combination with the disclosed option. By means of the mode valve system, the system according to the present invention for heat treatment may be configured for temporarily setting the mode valve system such that the coupling between the secondary outlet of the heat recovering section and the primary inlet of the heat recovering section is open while the coupling between the primary inlet of the heat recovering section and the system inlet is closed and/or while the coupling between the secondary outlet of the heat recovering section and the system outlet is closed.

The method may comprise temporarily setting the mode valve system such that the coupling between the secondary outlet of the heat recovering section and the primary inlet of the heat recovering section is open while the coupling between the primary inlet of the heat recovering section and the system inlet is closed and/or while the coupling between the secondary outlet of the heat recovering section and the system outlet is closed. Accordingly, the present invention may provide that water may be circulated between the heat application section and the heat recovering section, e.g. until the heat recovering section starts to operate as intended, i.e. by transferring heat from the second part of the heat recovering section to the first part of the heat recovering section. The step of circulating the water from the secondary outlet to the primary inlet may be carried out prior to the step of providing a flow of the water from the system inlet towards the system outlet via the heat application section and via the heat recovering section. The present invention may comprise circulating the water from the heat application section via the heat recovering section and back towards the heat application section by means of and via: the treatment pump; a bypass piping; and an open internal valve; such that the system inlet and the system outlet are bypassed. The purpose of circulating the water may be to ensure that the heat recovering section does recover heat, e.g. such that the water is pre-heated to a desired and/or expected temperature prior to being heated at the heat application section.

The system may be configured for provision of an initial flow phase wherein a flow rate of the water from the system inlet towards the system outlet is lower than during a subsequent flow phase. The step of providing a flow of the water from the system inlet towards the system outlet via the heat application section and via the heat recovering section may comprise an initial flow phase, wherein the flow rate is lower than during a subsequent flow phase. An initial flow phase may in particular be advantageously during start-up of the system/method according to the present invention.

The system may be configured for provision of an initial heating phase wherein more heat is applied to the water at the heat application section than during a subsequent heating phase. The step of applying heat to the water at the heat application section may comprise an initial heating phase wherein more heat is applied than during a subsequent heating phase. An initial heating phase may in particular be advantageously during start-up of the system/method according to the present invention.

An initial flow phase and/or an initial heating phase may be combined with circulation using the mode valve system.

Any one or more of the following may be variable/controllable: an initial flow rate; a subsequent flow rate; an initial heating rate; a subsequent heating rate.

The system may comprise one or more temperature sensors configured for obtaining one or more temperature measurements of the water prior to entering the heat application section and/or subsequent to leaving the heat application section and/or within the heat application section. Furthermore, the system may be configured for utilizing the one or more temperature measurements for controlling one or more or all of the following: a flow rate of the water through the heat application section; a heat disposing setting of the heat application section; and a setting of the mode valve system. The method may comprise: obtaining one or more temperature measurements of the water prior to entering the heat application section and/or subsequent to leaving the heat application section and/or within the heat application section. Furthermore, the method may comprise utilizing the one or more temperature measurements for controlling: a flow rate of the water through the heat application section and/or a heat disposing setting of the heat application section and/or a setting of the mode valve system.

One or more temperature measurements may be utilized to determine a required flow rate, such as an initial flow rate and/or a subsequent flow rate, and/or a required heat application rate, such as an initial heat application rate and/or a subsequent heat application rate, and/or to determine whether an initial circulation mode is required or not and/or the possible extent of such circulation mode.

Temperature measurements may be applied before and/or within and/or after any one or more of the following: heat recovering section; heat application section; a detention section. Usage of temperature measurements may be utilized for documenting valid heat treatment and/or for detecting any error and/or for controlling the system.

The system may be configured for utilizing the one or more temperature measurements for controlling the initial heating phase and/or the initial flow phase.

The method may comprise utilizing the one or temperature measurements for controlling the initial heating phase and/or the initial flow phase.

The system may not comprise a filter section configured to filter particles of a "desired size-limit" from the water while the water is flowing between the system inlet and the system outlet. The method may be void of a step wherein the water is filtered using a filter section configured to filter particles of a "desired size-limit" while the water is flowing between the system inlet and the system outlet. Accordingly, such limitation does not exclude the water from being filtered using a filter section configured to filter particles of larger than of the "desired size-limit" while flowing between the system inlet and the system outlet. A filter may aid in removal of living microorganisms. However, a filter may clog, which may render a water treatment system using a filter vulnerable. Accordingly, it is an advantage to provide a system without a filter, such as of a "desired size-limit". A filter having a small filter size may allow for removal of more and smaller living organisms from the water than a larger filter size does. However, a small filter size may clog more easily than a filter having a large filter size and the flow rate may be lower.

The present invention may comprise the limitation of not being filtered using a filter section configured to filter particles of a "desired size-limit" immediately before the step of applying heat to the water.

In case a ballast tank of the first vessel contains ballast water, which has been filtered (e.g. with a filter configured to filter 25 μm particles or another size) and subsequently treated, e.g. by means of UV light or a chemical such as chlorine, but where the treatment somehow has not lead to a desired and/or required reduction in living microorganisms in the ballast water, then the ballast water of that ballast tank in question (and possibly other ballast tanks of the first vessel) may be subject to heat treatment according to the present invention.

The step of temporarily coupling at least one of the system inlet and the system outlet to the ballast water piping system of the first vessel (as described further above) may comprise temporarily coupling the system outlet to the ballast water piping system of the first vessel, such that ballast water used for ballasting the first vessel is not filtered using a filter section configured to filter particles of a "desired size-limit" immediately before the water being subject to the heat treatment.

A desired size-limit may for instance be 25 μm, 45 μm, or 90 μm.

The system may comprise a boiler configured for applying heat to the water at the heat application section. The step of applying heat to the water may comprise using a boiler. Provision and/or usage of a boiler may facilitate a source of heat that may be easily regulated and/or that may be used for a mobile device comprising the system according to the present invention for heat treatment.

The system may comprise a hot fluid connector system, configured for being supplied with a flow of hot fluid from an external hot fluid source. The hot fluid connector system may be configured for applying heat to the water at the heat application section, such as at a first part thereof, e.g. by means of a heat exchanger. The step of applying heat to the water may comprise utilizing an external hot fluid source supplying a flow of hot fluid. The step of applying heat to the water may comprise utilizing a hot fluid connector system. The hot fluid may for instance comprise any one or more of the following: thermal oil; water; and steam. Such solution may provide an advantage of being readily scalable with respect to the need of heat to be applied to the water. Compared e.g. to a diesel driven boiler, an external heat source may provide the advantage of limited exhaust/pollution at the system.

The external hot fluid source may comprise a district heating system. Such may enable a high energy efficiency and or a low pollution at the location of the system according to the present invention.

The heat application section may comprise an electric heater configured for applying heat to the water. The step of applying heat to the water may comprise utilizing an electric heater. The electric heater may be provided at a third part of the heat application section. Provision and/or usage of an electric heater may have the advantage of being easy to regulate. Accordingly, it may be possible to switch between a high amount of applied heat to the water to a low amount within a short period of time compared to usage of a flow of hot fluid provided by an external source and/or by means of a boiler integrated with the system according to the present invention. An electric heater as part of the heat application section may be advantageously in combination with a boiler and/or an external hot fluid source.

The system may comprise a mobile container such as an intermodal container. The heat application section and the heat recovering section may be installed within the mobile container. Both the step of applying heat and the step of recovering heat may occur within a mobile container. Provision and/or usage of a mobile container may facilitate handling, i.e. e.g. shipment and/or relocation, of the system according to the present invention. Provision and/or usage of a mobile container may facilitate modular usage, such as parallel treatment using systems according to the present invention in parallel.

The system may be installed at a port. The method may take place at a port. Provision and/or usage of the present invention at a port may be particularly advantageous compared to usage of a fixed heat treatment system of a vessel at a port due to the energy requirements, which may be more easily handled by such non-fixed installation of the vessel in question.

The system may be fixed at a port. Both the heat application section and the heat recovering section may be fixed at a port. The system may be provided as a dockside facility.

The system may be situated at a vessel other than the first vessel. This may facilitate heat treatment of a vessel not being at a port, since the system being situated on the other vessel may be brought to the first vessel. Heat treatment may even be facilitated at a port, since the first vessel may not be near a dockside heat treatment system. Accordingly, the heat treatment system according to the present invention may be brought to the first vessel.

The system may be used at a port and/or at an anchorage and/or another place.

The system may comprise a detention section. The heat treatment piping system may be coupling the system inlet to the system outlet via the detention section. Accordingly, the water may flow from the heat application section to the second part of the heat recovering section via the detention section. The detention section may be configured for detaining the water flowing through the detention section for a pre-determined average detention time by having the heated water, which is flowing from the heat application section to the heat recovering section, being detained, such that the heated water is kept heated for the pre-determined average detention time. The step of providing a flow of the water from the system inlet towards the system outlet may comprise providing the flow via a detention section. The method may comprise detaining the water at the detaining section for a pre-determined average detention time by having the heated water, which is flowing from the heat application section towards the heat recovering section, being detained, such that the heated water is kept heated for the pre-determined average detention time. The detention section may be provided by means of a water container. The average detention time may for instance be at least 30 seconds, such as at least 60 seconds. The desired temperature and time may be related to each other. The average detention time may for instance be controlled by the flow rate and or by the type and/or setting of the detention section.

It may be an object of the present invention to provide heat treatment at a temperature and for a period of exposure that kills a certain amount/percentage of living organisms within the water. The higher the temperature, the lower time may be required, and vice versa. If the temperature is adequately high, then the required time may be obtainable by piping connection the heat application section to the second part of the heat recovering section.

According to the present invention the water of the first vessel may be heated at the heat application section, such that the water reaches a desired temperature. The method may comprise heating the water is heated at the heat application section, such that the water reaches a desired temperature. The desired temperature may for instance be at least 60° C., at least 65° C., at least 70° C., at least 75° C., at least 80° C., at least 85° C., or at least 90° C.

The system and/or the method may be configured for a flow of the water through the heat application section at a flow rate of at least 5 m³/h. Treatment of waste water form hull cleaning of the first vessel may require a capacity of about 5 m³/h to about 50 m³/h.

The system and/or the method may be configured for a flow rate of at least 100 m³/h. Treatment of ballast water of the first vessel during ballasting, or during de-ballasting, may require a flow rate of about 100 m³/h to about 300 m³/h.

The method may comprise providing the water from the system outlet to an outlet storage tank. For instance, water taken from a basin at a port or from a second vessel or from hull cleaning of the first vessel or another vessel may be subject to heat treatment according to the present invention and subsequently stored temporarily. Subsequently, water from such outlet storage tank may be used for ballasting the first vessel or another vessel. The outlet storage tank may be configured to hold at least 100 m³, such as at least 1000 m³. The outlet storage tank may be composed of a plurality of tanks.

The method may comprise providing the water from an inlet storage tank to the system inlet. For instance, water taken from a port or from a second vessel may be stored temporarily after the heat treatment for being used for ballasting a vessel afterwards. The inlet storage tank may be configured to hold at least 100 m³, such as at least 1000 m³. The outlet storage tank may be composed of a plurality of tanks.

The system for heat treatment may comprise a controller configured to control a system according to the present invention. The controller may comprise a PLC and/or the controller may be implemented by means of software.

FIG. 1 schematically illustrates a first embodiment of a system 102 according to the present invention for heat treatment of water. The system 102 for heat treatment of water of a first vessel (see e.g. ref. 40 or 40' or 40" on FIGS. 8-14) outside a fixed installation of the first vessel, the water comprising ballast water of the first vessel (see FIGS. 8-13) and/or waste water from hull cleaning of the first vessel (see FIG. 14), the system 102 comprising: a system inlet 4; a system outlet 10; a heat application section 8 configured for applying heat to the water, such that the water that is flowing through the heat application section 8 is heated; a heat recovering section 6 configured for recovering heat from the heated water, the heat recovering section 6 comprising a first part 7a and a second part 7b configured for exchanging heat; and a heat treatment piping system 20 coupling the system inlet 4 to the system outlet 10 via: the first part of the heat recovering section 7a; the heat application section 8; and the second part of the heat recovering section 7b; such that the water can flow: from the system inlet 4 to the first part of the heat recovering section 7a; from the first part 7a of the heat recovering section 6 to the heat application section 8; from the heat application section 8 to the second part 7b of the heat recovering section 6; and from the second part 7b of the heat recovering section 6 to the system outlet 10; the heat recovering section 6 being configured for exchanging heat such that the water, which is flowing through the second part 7b of the heat recovering section 6, is pre-heating the water, which is flowing through the first part 7a of the heat recovering section 6.

Furthermore, the system 102 comprises a treatment pump 12 and a mode valve system 18.

The treatment pump 12 is configured for providing the flow of the water between the system inlet 4 and the system outlet 10.

The heat recovering section 6 comprises: a primary inlet 6a; a primary outlet 6b; a secondary inlet 6c; and a secondary outlet 6d; the primary inlet 6a being coupled to the system inlet 4 via the mode valve system 18, the primary outlet 6b being coupled to the secondary inlet 6c via the heat application section 8, the secondary outlet 6d being coupled to the system outlet 10 via the mode valve system 18, the secondary outlet 6d being coupled to the primary inlet 6a via the mode valve system 18, the system 102 being configured for: temporarily setting the mode valve system 18 such that the coupling between the secondary outlet 6d and the primary inlet 6a is open while the coupling between the primary inlet 6a and the system inlet 4 is closed and/or while the coupling between the secondary outlet 6d and the system outlet 10 is closed.

The mode valve system 18 comprises: an inlet valve 18a provided between the system inlet 4 and the primary inlet 6a of the heat recovering section 6; an outlet valve 18c provided between the system outlet 10 and the secondary outlet 6d of the heat recovering section 6; and an internal valve 18b provided between the primary inlet 6a of the heat recovering section 6 and the secondary outlet 6d of the heat recovering section 6.

The temporary setting of the mode valve system for circulating the water from the secondary outlet to the primary inlet may be provided by having both, or alternatively just one of, the valves 18a and 18c closed while having the valve 18b open and while operating the pump 12, cf. FIG. 4.

FIGS. 3-4 schematically illustrate two different modes of operation of the first embodiment of FIG. 1. A valve-symbol filled in with black denotes an open valve, whereas a valve-symbol filled in with white denotes a closed valve.

Accordingly, FIG. 3 schematically illustrates the mode of operation wherein water may flow from the system inlet 4 to the system outlet 10 via: the first part of the heat recovering section 7a; the heat application section 8; and the second part of the heat recovering section 7b.

FIG. 2 schematically illustrates a second embodiment of a system 202 according to the present invention for heat treatment of water. The system 202 is identical to the system 102 except from the omission of the treatment pump 12 and the move valve system 18, instead of which the system 102 comprises piping 20 directly between the system inlet 4 and the first part 7a of the heat recovering system 6, as well as piping 20 directly between the system outlet 10 and the second part 7b of the heat recovering system 6.

FIG. 5 schematically illustrates a third embodiment of a system 302 according to the present invention for heat treatment of water. The system 302 is similar to the system 102. Accordingly, only or mainly the differences will be described in the following.

The system 302 comprises a boiler 14 configured for applying heat to the water at the heat application section 8, more particularly at a second part 16 of the heat application section 8. Heat may be applied from the boiler 14 to the water by means of appropriate piping 14. The second part 16 may comprise a heat exchanger.

The system 302 comprises a hot fluid connector system 15a, 15b, 15c configured for being supplied with a flow of hot fluid from an external hot fluid source (not illustrated). The hot fluid connector system 15a, 15b, 15c being configured for applying heat to the water at the heat application section 8, more particularly at the first part 15 of the heat application section 8. The first part 15 may comprise a heat exchanger. The external hot fluid source may comprise a district heating system.

The system 302 comprises an electric heater configured for applying heat to the water. The electric heater is integrated with the third part 17 of the heat application section 8.

Even though the system 302 is illustrated as comprising all of the parts 15, 16, and 17 of the heat application section 8, it is clear that another embodiment according to the present invention may comprise any one or any combination of the parts 15, 16, and 17.

The system 302 comprises a detention section 9. Accordingly, the heat treatment piping system 20 coupling the system inlet 4 to the system outlet 10 via the detention section 9, such that the water can flow from the heat application section 8 to the second part 7b of the heat recovering section 6 via the detention section 9. The detention section 9 being configured for detaining the water flowing through the detention section 9 for a pre-determined average detention time by having the heated water, which is flowing from the heat application section 8 to the heat recovering section 6, being detained, such that the heated water is kept heated for the pre-determined average detention time.

The system 302 comprises three temperature sensors 22a, 22b, 22c configured for obtaining one or more temperature measurements of the water prior to entering the heat application section (cf. sensor 22a) and subsequent to leaving the heat application section (cf. sensor 22c) and within the heat application section (cf. sensor 22b). It is clear that any number of temperature sensors may be provided for any other embodiment according to the present invention.

The straight lines within any of: the heat recovering section 6; the heat application section 8; and the detention section 9; on any of FIGS. 1-5, which straight lines are interconnecting the sections of piping 20, merely illustrates the overall direction and connection of the flow of the water within the system according to the present invention. The straight sections do neither imply nor exclude any form for flow along a straight line.

FIG. 6 schematically illustrates an embodiment of a controller 30 configured to control a system 302 according to the present invention. By means of the controller 30 the system 302 is configured for provision of an initial flow phase wherein a flow rate of the water from the system inlet 4 towards the system outlet 10 is lower than during a subsequent flow phase.

By means of the controller 30 the system 302 is configured for provision of an initial heating phase during which more heat is applied to the water at the heat application section 8 than during a subsequent heating phase.

By means of the controller 30 the system 302 is configured for utilizing the one or more temperature measurements from the sensors 22a, 22b, 22c for controlling: a flow rate of the water through the heat application section 8 and/or a heat disposing setting of the heat application section 8 and/or a setting of the mode valve system 18.

By means of the controller 30 the system 302 is configured for utilizing the one or more temperature measurements from the sensors 22a, 22b, 22c for controlling the initial heating phase and/or the initial flow phase.

Measurements signals are provided to the controller 30 via the signal lines 32a, 32b, 32c.

Measurements signals are provided by the controller 30 via the signal lines 34a, 34b, 34c.

FIG. 7 schematically illustrates an embodiment of a method 90 according to the present invention for heat treatment of water. The method 90 comprises: provision 92 of a flow of the water from a system inlet towards a system outlet; and applying 94 heat to the water; and recovering 96 heat from the heated water. Despite being shown in a sequential order in FIG. 7, the steps 92, 94, 96 may operate in parallel with each other.

FIGS. 8-13 schematically illustrate various setups and modes of utilization of a system 2 according to the present invention for heat treatment of ballast water of a first vessel 40, 40' as well as a method according to the present invention for heat treatment of ballast water of a first vessel 40, 40'. The system 2 may comprise any of the systems 102, 202, 302. The vessel 40, 40', 40" may comprise a plurality of ballast tanks, such as including a first ballast tank 42a and a second ballast tank 42b.

The system 2 being configured for temporarily coupling at least one of the system inlet 4 and the system outlet 10 to a ballast water piping system 46, 44 of the first vessel 40, 40' using vessel piping connector (not illustrated). The ballast water piping system 46 may be configured for ballasting and/or de-ballasting the vessel 40, 40', 40". The ballast water piping system 46 may comprise appropriate valves (not illustrated) such that just one ballast tank or just one group of ballast tanks out of a plurality of ballast tanks may be in fluid connection with the ballast water piping system 46 at a given time. The ballast water piping system 44, 44" (cf. FIGS. 11-13) may comprise appropriate valves (not illustrated) such that just one ballast tank or just one group of ballast tanks out of a plurality of ballast tanks may be in fluid connection with the ballast water piping system 44, 44" at a given time.

The system 2 may be configured for having a ballast pump (not illustrated) of the first vessel 40 being utilized for providing a flow of the ballast water from at least one ballast tank 42a, 42b of the first vessel 40, 40' towards the system inlet 4 or from the system outlet 10 towards at least one ballast tank 42a, 42b of the first vessel 40, 40'.

Figure 9:
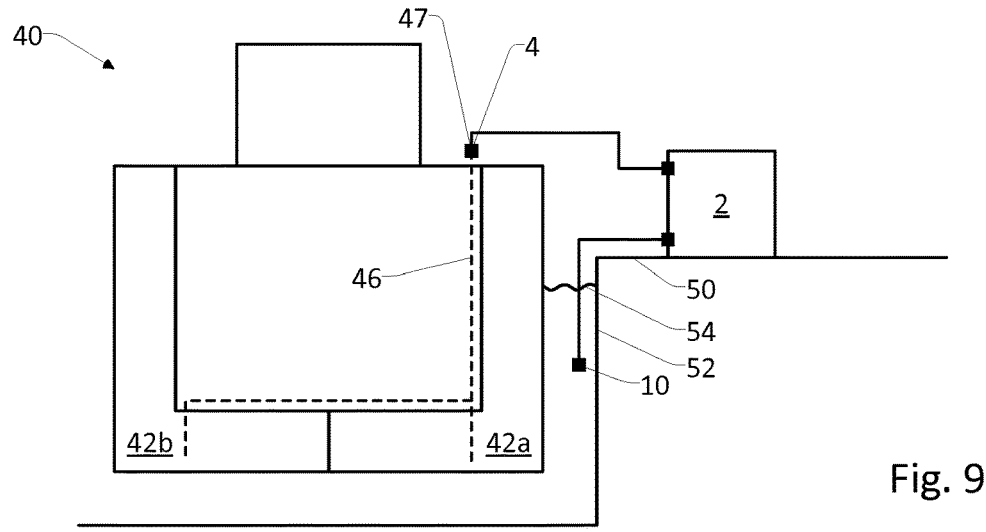
Figure 10:
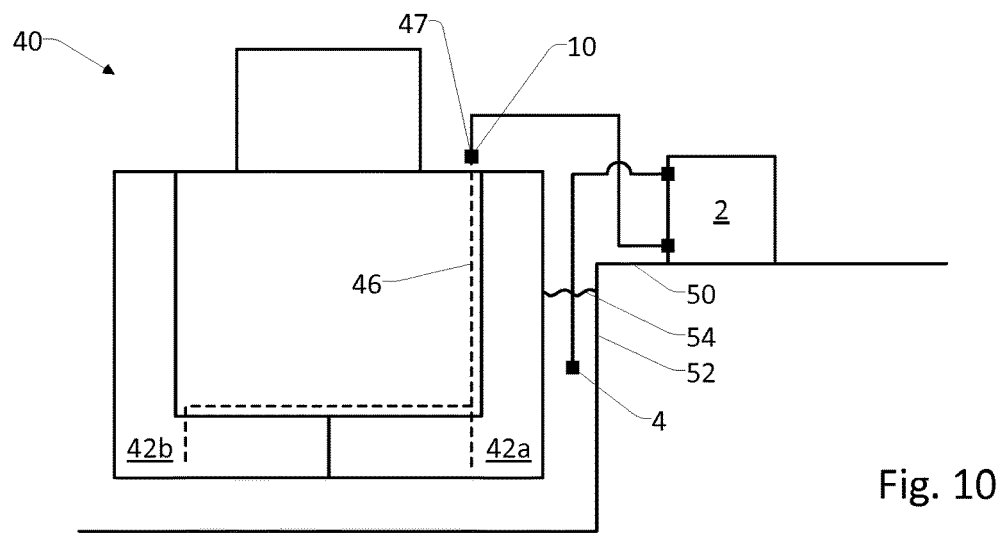

As illustrated by means of FIGS. 9 and 10, any of the system inlet 4 and the system outlet 10 may be utilized for coupling to the ballast water piping 46 of the first vessel 40. As an alternative to interchanging the couplings of the system inlet 4 and the system outlet 10 respectively, the system according to the present invention may comprise an internal switching mechanism allowing to switch an a coupling between functioning as the system inlet 4 and the system outlet 10. Such may for instance be realized by means of a valve coupling being similar to an H bridge known from an electronic circuit.

Figure 11:
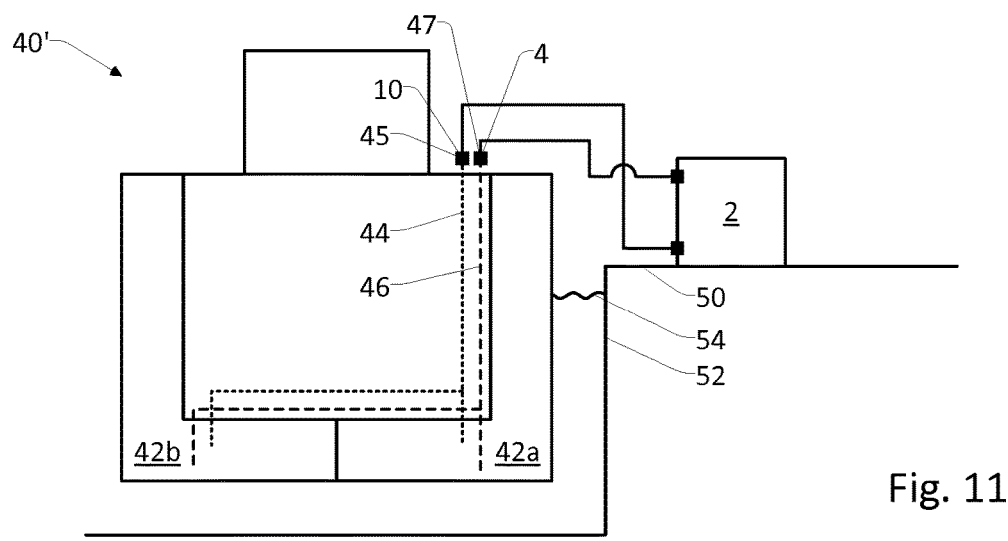

As illustrated by means of FIG. 11, the system 2 is configured for temporarily coupling the system inlet 4 to the ballast water piping system 46 of the first vessel 40', and configured for providing the water from the first vessel 40' back to the first vessel via the system outlet 10.

Figure 12:
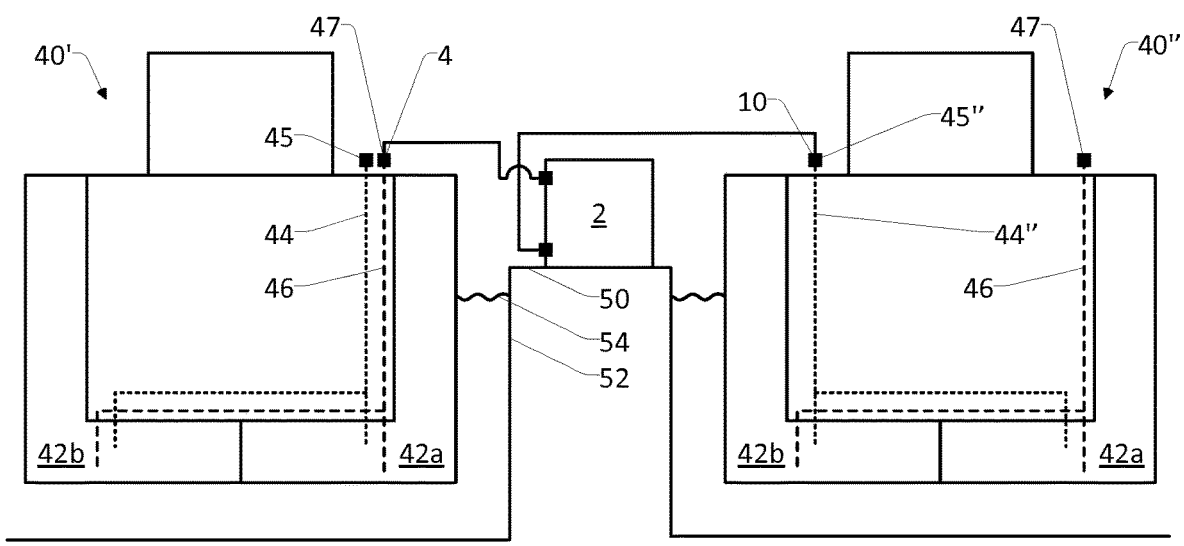

As illustrated by means of FIG. 12, the system 2 is configured for temporarily coupling a second of the system inlet 4 and the system outlet 10 to a ballast water piping system 44" of a second vessel 40", such that water may be provided between the first vessel 40' and the second vessel 40" via the system 2 for heat treatment.

FIG. 14 schematically illustrates a setup and a mode of utilization of a system 2 according to the present invention for heat treatment of waste water from hull cleaning of a first vessel 40 as well as a method according to the present invention for heat treatment of waste water from hull cleaning of a vessel. FIG. 14 illustrates a system 70 for handling waste water from hull cleaning of a vessel. The waste water is provided by a device 72 for hull cleaning of the vessel 40. The system 70 may comprise a filter, e.g. configured to filter particles of 100 μm or larger.

The system 2 may be installed at a port, cf. FIGS. 8-12 as well as FIG. 14, such as being fixed at the port. The illustrations include the following: a dock 50 at a port; a basin 52 configured for accommodating a vessel 40, 40', 40" at a port; and the surface 54 of the water at the port.

Figure 13:
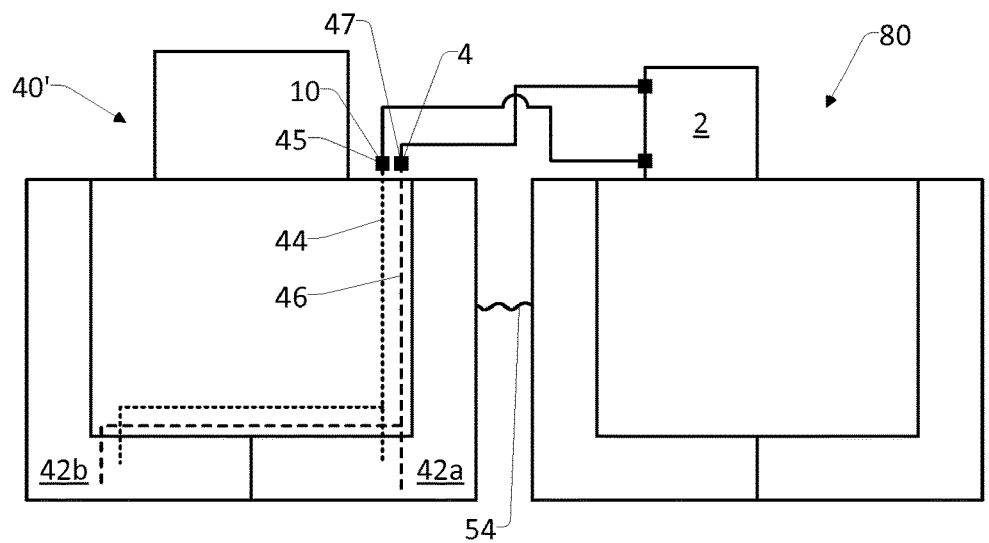

As illustrated by means of FIG. 13, the system 2 is configured for being situated at a vessel 80 other than the first vessel 40, 40'. Accordingly, the other vessel 80 may be utilized for provision of heat treatment of water of the first vessel 40, 40', e.g. at an anchorage.

None of the illustrated embodiments 2, 102, 202, 302 comprises a filter section configured to filter 25 μm particles from the water while the water is flowing between the system inlet 4 and the system outlet 10.

Any of the systems 2, 102, 202, 302 may comprise a mobile container, wherein both the heat application section and the heat recovering section are installed within the mobile container.

FIG. 15 schematically illustrates a first embodiment of a heat treatment and water storage system 60 comprising the system 2 and comprising an outlet storage tank 64 coupled to the system outlet 10 and an inlet storage tank 62 coupled to the system inlet 4. Another embodiment may comprise just one of the inlet storage tank 62 and the outlet storage tank 64. The system 60 or another system comprising just one of the inlet storage tank 62 and the outlet storage tank 64 may be utilized for any of the situations illustrated by means of FIGS. 8-14 by having the storage inlet 63 substituting/taking the place of the system inlet 4 and/or by having the storage outlet 65 substituting/taking the place of the system outlet 10.

For any claim enumerating several features, several of these features may be embodied by one and the same system. The mere fact that certain measures are recited in mutually different dependent claims or described in different embodiments does not indicate that a combination of these measures cannot be used to advantage.

Although particular embodiments have been shown and described, it will be understood that they are not intended to limit the claimed invention, and it will be obvious to those skilled in the art that various changes and modifications may be made without departing from the spirit and scope of the claimed inventions. The specification and drawings are, accordingly, to be regarded in an illustrative rather than restrictive sense. The claimed invention is intended to cover alternatives, modifications, and equivalents.

It should be emphasized that the term "comprises/comprising" when used in the present disclosure is taken to specify the presence of stated features, integers, steps or components but does not preclude the presence or addition of one or more other features, integers, steps, components or groups thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

LIST OF AT LEAST SOME OF THE REFERENCES OF THE DRAWINGS, WHICH REFERENCES MAY REFER TO THE FOLLOWING 2, 102, 202, 302: system for heat treatment of ballast water of a vessel and/or waste water from hull cleaning of the vessel;
4: system inlet;
6: heat recovering section configured to pre-heat incoming ballast water by recovering heat from outgoing ballast water;
6a: primary inlet; 6b: primary outlet; 6c: secondary inlet; 6d: secondary outlet;
7a: first part of the heat recovering section; 7b: second part of the heat recovering section;
8: heat application section configured to apply heat to the water;
9: retention section;
10: system outlet;
12: treatment pump;
14: boiler; 14a: tubing;
15: first heat applying part, e.g. comprising a heat exchanger;
15a, 15b, 15c: hot fluid connector system;
15a, 15b: connectors, configured to be supplied with a flow of hot fluid from an external hot fluid source;
15c: tubing for conveying the hot fluid to the first heat applying part;
16: second heat applying part, e.g. comprising a heat exchanger;
17: third heat applying part, e.g. comprising an electric heating unit;
18a, 18b, 18c: valves;
20: heat treatment piping system;
22a, 22b, 22c: temperature sensors;
30: controller for controlling a mode and/or setting of the system;
32a, 32b, 32c: measurements signals provided to the controller;
34a, 34b, 34c: control signals provided by the controller;
40, 40': vessel;
42a, 42b: ballast tank;
44, 44": ballast water piping system, e.g. mainly for ballasting;
45, 45": inlet on the vessel for ballast water piping system, e.g. mainly for ballasting;
46: ballast water piping system, e.g. mainly for de-ballasting;
47: inlet on the vessel for ballast water piping system, e.g. mainly for de-ballasting;
50: dock at a port;
52: basin configured for accommodating a vessel at a port;

54: water surface;
62: inlet storage tank coupled to the system inlet;
63: storage inlet;
64: outlet storage tank coupled to the system outlet;
65: storage outlet;
70: system for handling waste water from hull cleaning of a vessel;
72: device for hull cleaning of a vessel;
90: method;
92: provision of a flow of the water from a system inlet towards a system outlet;
94: applying heat to the water;
96: recovering heat from the heated water;

What is claimed is:

1. A system for heat treatment of water of a first vessel, the water comprising ballast water of the first vessel and/or waste water from hull cleaning of the first vessel, the system comprising:
a system inlet;
a system outlet;
a heat application section;
a heat recovering section comprising a primary inlet, a primary outlet, a secondary inlet, a secondary outlet, a first part, and a second part; and
a heat treatment piping system coupling the system inlet to the system outlet via at least the first part of the heat recovering section, the heat application section, and the second part of the heat recovering section;
the system being configured for a flow of the water from the system inlet to the system outlet,
the system being non-fixed and not forming part of any fixed installation of the first vessel,
the flow including the water flowing from the system inlet to and through the first part of the heat recovering section via the primary inlet,
the flow including the water flowing from the first part of the heat recovering section via the primary outlet to and through the heat application section,
the flow including the water flowing from the heat application section to and through the second part of the heat recovering section via the secondary inlet,
the flow including the water flowing from the second part of the heat recovering section via the secondary outlet to the system outlet,
the heat application section being configured to apply heat to the water such that the water is heated when flowing through the heat application section during use of the system,
the system being configured to operate at a flow rate of at least 5 m³/h through the heat application section,
the first part and the second part of the heat recovering section being configured to exchange at least part of the heat such that during the use of the system the water, which is flowing through the second part of the heat recovering section, is pre-heating the water, which is flowing through the first part of the heat recovering section,
the system comprising a mode valve system,
the mode valve system providing coupling between the system inlet and the primary inlet,
the mode valve system providing coupling between the secondary outlet and the system outlet,
the mode valve system providing coupling between the secondary outlet and the primary inlet,
the system being configured to temporarily set the mode valve system such that the coupling between the secondary outlet and the primary inlet is open while the coupling between the system inlet and the primary inlet is closed and/or while the coupling between the secondary outlet and the system outlet is closed.

2. The system according to claim 1, wherein the water comprises the ballast water of the first vessel, the system being configured to temporarily couple a first one of the system inlet and the system outlet to a ballast water piping system of the first vessel using a vessel piping connector.

3. The system according to claim 2, wherein the vessel piping connector comprises a flange configured to temporarily couple the first one of the system inlet and the system outlet to the ballast water piping system of the first vessel.

4. The system according to claim 2, the system being configured to have a ballast pump of the first vessel being utilized for providing a flow of the ballast water from at least one ballast tank of the first vessel towards the system inlet or from the system outlet towards the at least one ballast tank of the first vessel.

5. The system according to claim 2, the system being configured to temporarily couple the system inlet to the ballast water piping system of the first vessel, and the system being configured to provide the water from the first vessel back to the first vessel via the system outlet.

6. The system according to claim 2, the system being configured to temporarily couple a second one of the system inlet and the system outlet to a ballast water piping system of a second vessel, such that the water may be provided between the first vessel and the second vessel via the system for heat treatment.

7. The system according to claim 1, comprising a treatment pump configured to provide the flow.

8. The system according to claim 1, wherein the mode valve system comprises:
an inlet valve provided between the system inlet and the primary inlet of the heat recovering section;
an outlet valve provided between the system outlet and the secondary outlet of the heat recovering section; and
an internal valve provided between the primary inlet of the heat recovering section and the secondary outlet of the heat recovering section,
wherein the mode valve system provides the coupling between the secondary outlet and the system outlet via the outlet valve, and wherein the mode valve system provides the coupling between the secondary outlet and the primary inlet via the internal valve.

9. The system according to claim 1, the system being configured to provide an initial flow phase wherein the flow rate is lower than during a subsequent flow phase.

10. The system according to claim 1, the system being configured to provide an initial heating phase wherein more heat is applied to the water at the heat application section than during a subsequent heating phase.

11. The system according to claim 1, comprising one or more temperature sensors configured to obtain one or more temperature measurements of the water prior to entering the heat application section and/or subsequent to leaving the heat application section and/or within the heat application section; the system being configured to utilize the one or more temperature measurements for controlling: the flow rate and/or a heat disposing setting of the heat application section and/or a setting of the mode valve system.

12. The system according to claim 11, the system being configured to provide an initial flow phase wherein the flow rate is lower than during a subsequent flow phase, the system being configured to utilize the one or more temperature measurements for controlling the initial flow phase.

13. The system according to claim 1, not comprising a filter section configured to filter 25 μm particles from the water while the water is flowing from the system inlet to the system outlet.

14. The system according to claim 1, not comprising a filter section configured to filter 45 μm particles from the water while the water is flowing from the system inlet to the system outlet.

15. The system according to claim 1, comprising a boiler configured to apply at least part of the heat to the water at the heat application section.

16. The system according to claim 1, comprising a hot fluid connector system, the system being configured to be supplied with a flow of hot fluid from an external hot fluid source, the hot fluid connector system being configured to apply at least part of the heat to the water at the heat application section.

17. The system according to claim 16, wherein the external hot fluid source comprises a district heating system.

18. The system according to claim 1, wherein the heat application section comprises an electric heater configured to apply at least part of the heat to the water.

19. The system according to claim 1, comprising a mobile container, wherein both the heat application section and the heat recovering section are installed within the mobile container.

20. The system according to claim 1, being installed at a port.

21. The system according to claim 20, being fixed at the port.

22. The system according to claim 1, being situated or configured to be situated at a vessel other than the first vessel.

23. The system according to claim 1, comprising a detention section, the heat treatment piping system coupling the system inlet to the system outlet via the detention section, such that the water can flow from the heat application section to the second part of the heat recovering section via the detention section, the detention section being configured to detain the water flowing through the detention section for a pre-determined average detention time by having the heated water, which is flowing from the heat application section to the heat recovering section, being detained, such that the heated water is kept heated for the pre-determined average detention time.

24. The system according to claim 1, the system being configured to heat the water at the heat application section, such that the water reaches a temperature of at least 60° C.

25. The system according to claim 1, wherein the flow rate is at least 100 m$^3$/h.

26. A heat treatment and water storage system comprising the system according to claim 1, and comprising an outlet storage tank coupled to the system outlet and/or an inlet storage tank coupled to the system inlet.

27. The system according to claim 11, the system being configured to provide an initial heating phase wherein more heat is applied to the water at the heat application section than during a subsequent heating phase, the system being configured to utilize the one or more temperature measurements for controlling the initial heating phase.

* * * * *